US009093841B2

(12) United States Patent
San Andres et al.

(10) Patent No.: US 9,093,841 B2
(45) Date of Patent: Jul. 28, 2015

(54) POWER DISTRIBUTION NETWORK EVENT CORRELATION AND ANALYSIS

(75) Inventors: Ramon Juan San Andres, Duluth, GA (US); Atul Nigam, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 748 days.

(21) Appl. No.: 13/398,196

(22) Filed: Feb. 16, 2012

(65) Prior Publication Data

US 2013/0218354 A1 Aug. 22, 2013

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 3/00 | (2006.01) |
| G06Q 50/06 | (2012.01) |
| H02J 13/00 | (2006.01) |

(52) U.S. Cl.
CPC . H02J 3/00 (2013.01); G06Q 50/06 (2013.01); H02J 13/0006 (2013.01); H02J 2003/001 (2013.01); H02J 2003/007 (2013.01); Y02E 60/74 (2013.01); Y02E 60/76 (2013.01); Y04S 10/30 (2013.01); Y04S 10/52 (2013.01); Y04S 10/522 (2013.01); Y04S 40/22 (2013.01)

(58) Field of Classification Search
CPC ....... Y04S 10/30; Y04S 10/52; Y04S 10/522; G06Q 50/06; H02J 13/0006; H02J 3/00; H02J 2003/001; Y02E 60/74
USPC .......................................... 700/286, 292–294
See application file for complete search history.

(56) References Cited

U.S. PATENT DOCUMENTS

| 7,526,391 | B2 * | 4/2009 | Bickel ............................. 702/57 |
| 7,729,808 | B2 | 6/2010 | Nasle et al. |
| 7,979,222 | B2 | 7/2011 | Donde et al. |
| 8,036,872 | B2 | 10/2011 | Nasle |
| 2004/0225648 | A1 * | 11/2004 | Ransom et al. ................... 707/3 |
| 2005/0090995 | A1 * | 4/2005 | Sonderegger ................... 702/57 |
| 2009/0216910 | A1 * | 8/2009 | Duchesneau ................. 709/250 |
| 2009/0265041 | A1 * | 10/2009 | Benjamin ..................... 700/292 |
| 2010/0235285 | A1 * | 9/2010 | Hoffberg ........................ 705/75 |
| 2010/0317420 | A1 * | 12/2010 | Hoffberg ........................ 463/1 |
| 2011/0016342 | A1 * | 1/2011 | Rowan et al. ................. 713/340 |
| 2011/0204720 | A1 * | 8/2011 | Ruiz et al. ..................... 307/66 |
| 2011/0219208 | A1 * | 9/2011 | Asaad et al. ................... 712/12 |

* cited by examiner

Primary Examiner — Ronald Hartman, Jr.
(74) Attorney, Agent, or Firm — Sutherland Asbill & Brennan LLP

(57) ABSTRACT

A method for power distribution network correlation and analysis includes receiving event data from a plurality of data sources, identifying an event of interest, retrieving, in a querying engine, the event data, correlating the event data and the event of interest and identifying one or more root causes of the event of interest.

20 Claims, 5 Drawing Sheets ized form and
POWER DISTRIBUTION NETWORK EVENT CORRELATION AND ANALYSIS

BACKGROUND OF THE INVENTION

The subject matter disclosed herein relates to power distribution networks, and more particularly to systems and methods for correlating and analyzing power distribution network events.

Power distribution networks can experience several power distribution network events that include corresponding relevant data from a variety of sources. In addition, a particular power distribution network event may have a root cause that is related to a different power distribution network or is due to an event outside of power distribution networks such as weather conditions, catastrophes and the like. Currently it is difficult to identify these seemingly unrelated events to plan for power distribution network structure, estimate equipment and personnel requirements, position repair crews, and estimate possible event probabilities given current circumstances (e.g. current weather patterns, tornado advisories, and the like).

BRIEF DESCRIPTION OF THE INVENTION

According to one aspect of the invention, a method for power distribution network correlation and analysis is described. The method includes receiving event data from a plurality of data sources, identifying an event of interest, retrieving, in a querying engine, the event data, correlating the event data and the event of interest and identifying one or more root causes of the event of interest.

According to another aspect of the invention, a computer program product including a non-transitory computer readable medium storing instructions for causing a computer to implement a method for power distribution network correlation and analysis is described. The method includes receiving event data from a plurality of data sources, identifying an event of interest, retrieving, in a querying engine, the event data, correlating the event data and the event of interest and identifying one or more root causes of the event of interest.

According to yet another aspect of the invention, a system for power distribution network analysis is described. The system includes an event database storing event data from a plurality of filtered and normalized data sources, wherein the event data is filtered and normalized, a querying engine coupled to the event database, a correlation engine coupled to the querying engine, and configured to match characteristics of an event of interest with characteristics of event data from a plurality of data sources and a root-cause analysis engine coupled to the correlation engine, and configured to discover patterns among the event of interest and the event data to identify one or more root-causes of the event of interest.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
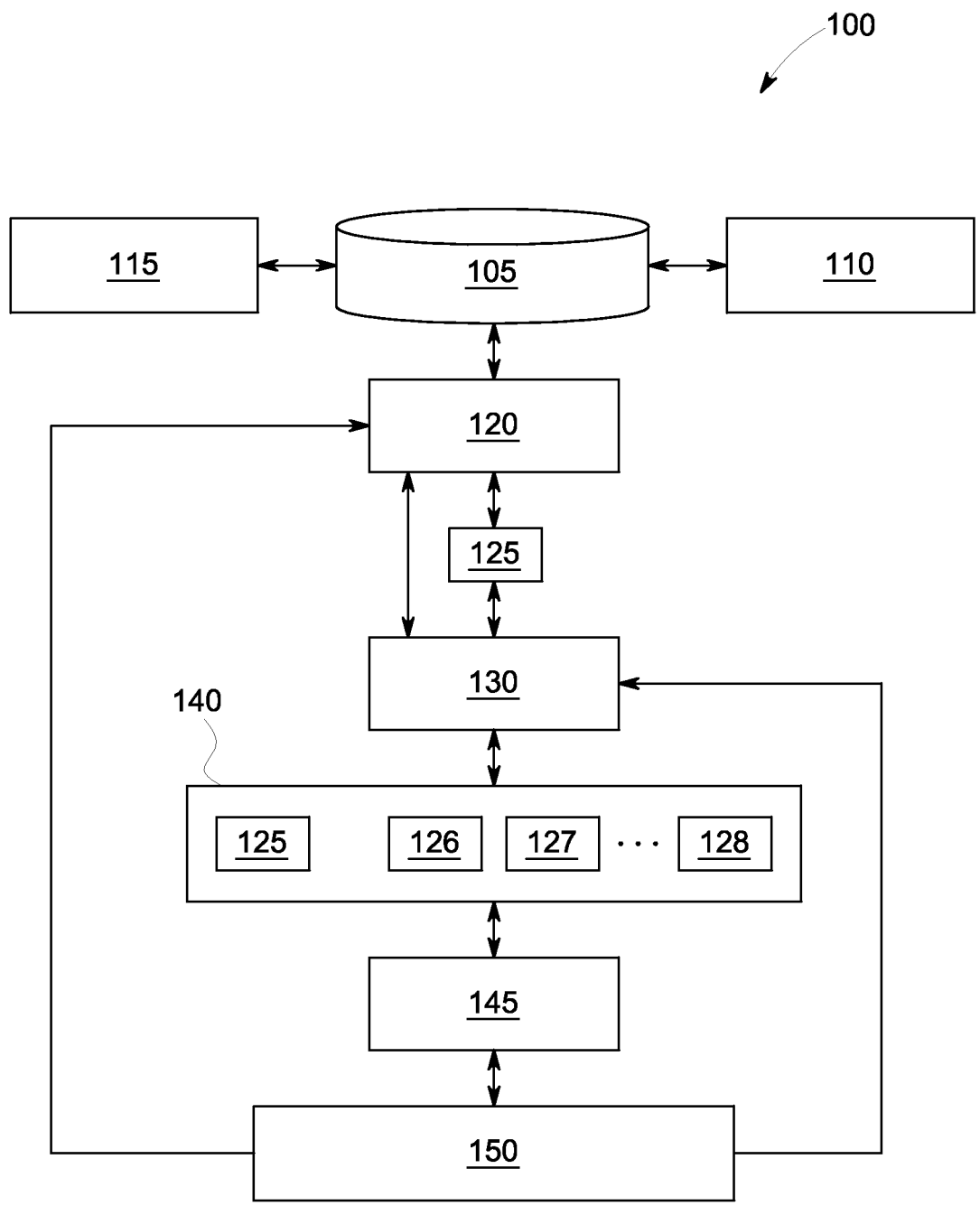
FIG. 1 diagrammatically illustrates an exemplary system for correlating power distribution network events and analyzing root causes of the power distribution network events.

FIG. 1 diagrammatically illustrates an exemplary system 100 for correlating power distribution network events and analyzing root causes of the power distribution network events. The system 100 includes a power distribution network event database 105 in which events related to power distribution events, such as power distribution network events 110 and external events 115, are stored in a normalized form and from which the events of interest can be recovered. In exemplary embodiments, the power distribution network events 110 include both events from the system 100 and other various power distribution networks. For example, the power distribution network events 110 can include but are not limited to blackouts; switch states (i.e., open/close); and load values that exceed a predetermined threshold value. As such, the analytical capabilities of the system 100 go beyond the analysis of events within a single power distribution network and are able to correlate events across power distribution networks. Additionally, event correlation is performed based on any number of different parameters beyond time. The events of interest can also include the external events 115, that is, other external sources such as but not limited to: weather events (e.g. temperature, wind direction and speed, barometric pressure); and natural disaster events (e.g., earthquakes and tornados). It will be appreciated that the events of interest can include any event that can affect a power distribution network. In exemplary embodiments, the power distribution network can be any electrical distribution system for the delivery of electricity to consumers. As such, the power distribution network can include, but is not limited to power generation plants, transmission lines, transformers, substations, demand centers, and the like.

In exemplary embodiments, the various sources of data from the events of interest for the event database 105 may all not be relevant. As such, before the events of interest are stored in the event database 105, the system 100 can filter out events that can be determined irrelevant by a series of algorithms that are programmed to select events that may be beyond certain predetermined thresholds. In exemplary embodiments, the system 100 is aware of the normal (predetermined) range of input values at a particular point in time (e.g. temperature values for a particular place at a particular time of the year). Depending on the input data source, the system can filter data by applying rules-based processing, patterns-based analysis, Bayesian analysis and the like. The system 100 can also be more generic and implement a neural network-based filter.

In exemplary embodiments, the data stored in the event database 105 is thus from a variety of sources that can have varying data structure types. As such, as the events are filtered, the event data is also normalized. The system 100 normalizes the data to transform the various data structure types into a single data format that can then be stored in the event database 105. The system 100 is therefore dynamic and adaptable to reprogramming as new data structure types are encountered. As new data sources are identified, the system 100 can be appropriately updated to receive and convert the new data type to the normalized data type that is stored in the event database 105. As such, the system 100 consumes vast amounts of data and data types from a multitude of sources that identify events of interest represented by data that falls out of the "normal" range, and stores those events in the event database 105.

In exemplary embodiments, the system 100 further includes a querying engine 120 coupled to and configured to extract the normalized data from the event database 105. In exemplary embodiments, the querying engine 120 is configured to access information such as but not limited to: data values and ranges; events similar to a particular current event; and time data. Furthermore, the querying engine 120 is configured to retrieve one or more events of interest such as event of interest 125, along with several potentially related events that can be correlated with the event of interest 125 as described further herein. The querying engine 120 can be implemented to retrieve all data values and ranges for all events of interest or a particular point in time. In addition, as the event database 105 grows and evolves, it can keep a history of power distribution network events and the data related to those historic power distribution network events. As such, the querying engine 120 can be implemented to retrieve events that are similar to a particular event (e.g., events that are surrounded by a set of input data that matches a particular event given matching criteria). In this way, a user can input criteria into the querying engine 120 in order to retrieve historic events. The user can then use this retrieved data to analyze a current event that is similar to the historic event and thereby save time and effort in figuring out how to manage the current event. The user can also take action or preemptive measures to avoid a similar power distribution network event. The querying engine 120 is also configured to retrieve all input (time) data (or ranges) for all time points (given a certain granularity) for a particular time period. In this way, a user (or analytical engine) can analyze a given time period and corresponding data from the events of interest during the given time period.

In exemplary embodiments, the querying engine 120 is configured to retrieve one or more events of interest such as event of interest 125, along with several potentially related events that can be correlated with the event of interest 125. The system 100 therefore includes a correlation engine 130 (e.g., correlation software) coupled to the querying engine 120. The correlation engine 130 is configured to retrieve the event of interest 125 as well as related events 126, 127, 128 (e.g., either or both of the power distribution network events 110 and the external events 115). The correlation engine 130 is further configured to retrieve all related events that may be attributable to the event of interest 125, due to surrounding circumstances (e.g., proximity in time). The events 125, 126, 127, 128 can be stored in a temporary cache 140 or other suitable storage medium or memory, which is coupled to the correlation engine 130. The system 100 further includes a root-cause analysis engine 145 (e.g., root-cause analysis software) coupled to the temporary cache 140. The root-cause analysis engine 145 is configured to calculate the root cause or causes of the event of interest 125 after the correlation engine 130 has identified and retrieved the various potentially related events. The root-cause analysis engine 145 utilizes the discovered correlations to investigate the root causes of particular events of interest (e.g., the event of interest 125).

In exemplary embodiments, the system 100 further includes an interface 150 coupled to the root-cause analysis engine 145. The interface 150 can include several interface types in order to access and utilize the system 100 functionality. For example, the interface 150 can be coupled to the querying engine 120 to provide basic querying functionality in order to query the event database 105. The interface 150 is configured to access various analysis tools, which can be various software interfaces to obtain system state information surrounding any particular event or any particular point in time. The analysis tools include the correlation engine 130 and the root-cause analysis engine 145. The various analysis tools can therefore enable the querying engine 120 for advanced analysis applications to perform the root-cause analysis of events, to perform the correlation analysis, to generate prediction models, to drive simulations, to rerun events, to be the source of semantic-based queries and the like. As such, the external system can be any suitable external system, such as but not limited to computing devices, mobile devices, smart devices and the like. The various interfaces described herein, which are only illustrative and can include various other interfaces, provide visualization and analysis of all circumstances surrounding the particular event of interest 125. The system 100 therefore enables sophisticated forensic analysis of power distribution network events, which allows correlation, root-cause analysis, prediction models and power distribution network planning.

The system 100 therefore utilizes the event database 105 containing normalized events acquired from diverse sources including multiple distribution systems. The system 100 analyzes the events and discovers correlations between the events. The discovered correlations are used to perform root-cause analysis of events. The discovery of correlations between events can be performed through a variety of dimensions (other than time). The interface 150 allows for multiple forms of reporting and visualization of the discovered correlations.

In exemplary embodiments, correlation and root-cause analysis commences when the querying engine 120 is used to retrieve the event of interest 125. The event of interest 125 may be retrieved based on the time at which it occurred, its location, its circumstances, or some other criteria as described herein. The correlation engine 130 and root-cause analysis engine 145 may be initiated manually as the result of an operator interacting with the interface 150, or automatically when a monitoring process identifies an event that meets certain pre-configured characteristics. In exemplary embodiments, after the event of interest 125 has been identified, the correlation engine 130 accesses the querying engine 120 to investigate and identify all event correlations, which can include retrieval of the related events 126, 127, 128.

Figure 2:
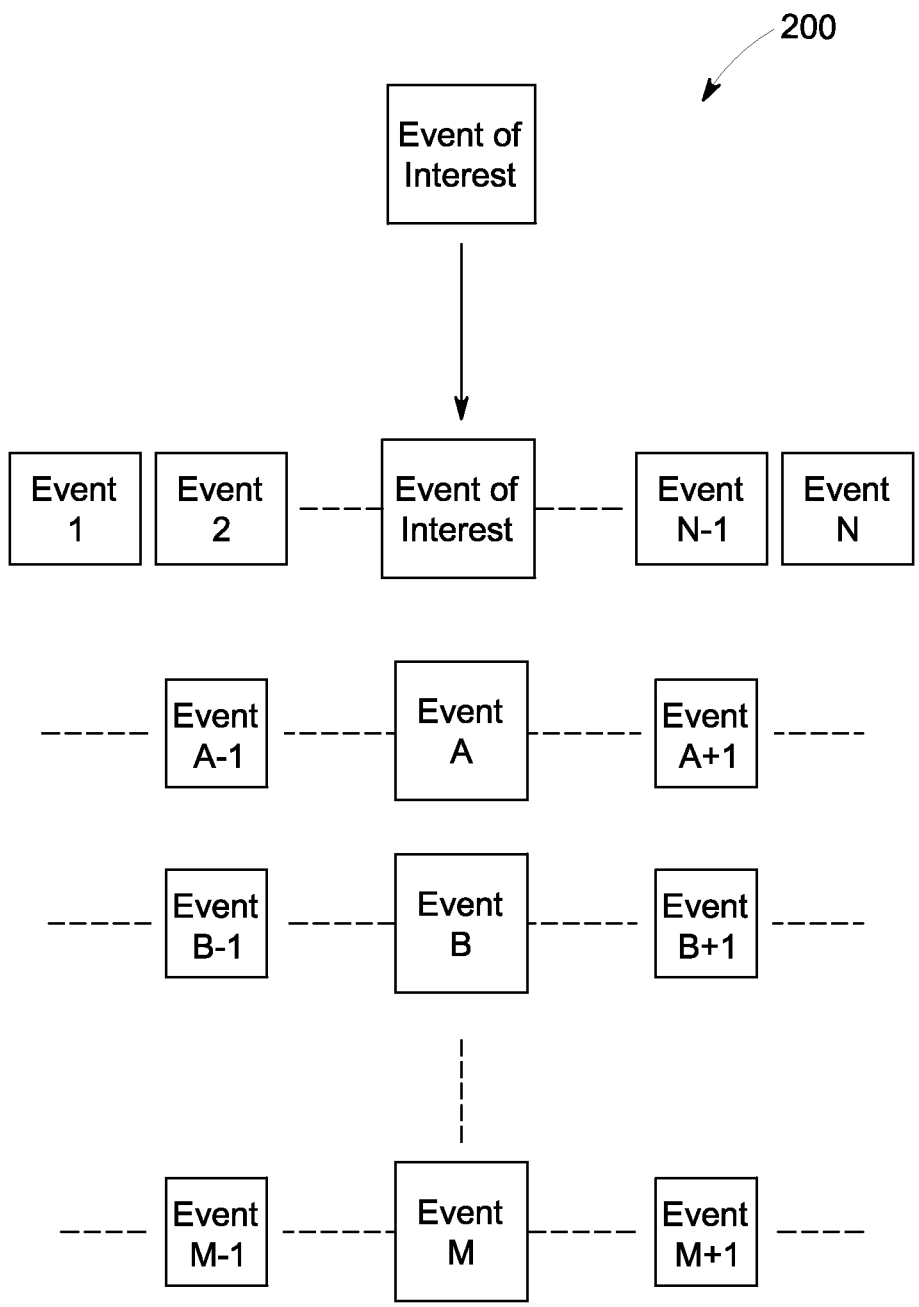
FIG. 2 diagrammatically illustrates a chart of an example of an identification of potentially related events.

FIG. 2 diagrammatically illustrates a chart 200 of an example of an identification of potentially related events. In the example, an Event of Interest (e.g., the event of interest 125 from FIG. 1) is identified by the user or automatically by the querying engine 120. In addition, other potentially related events (e.g., the power distribution network events 110 and the external events 115) are also identified. In exemplary embodiments, the system 100 identifies events that occur in a time period prior to the Event of Interest (e.g., Event 1, Event 2) and in a time period after the Event of Interest (e.g., Event N−1, Event N). The querying engine 120 can access the event database 105 to identify other events with similar characteristics to the Event of Interest. Similar characteristics are any set of characteristics that match the Event of Interest within predetermined thresholds. A sequence of events that occurred within a certain time period before and after each of the retrieved events is obtained. The example illustrates several similar retrieved events (e.g., Event A, Event B and Event M) and corresponding related events prior to and after the similar events (e.g., Event A−1, Event A+1, Event B−1, Event B+1, Event M−1, Event M+1). As such, the example illustrates that the querying engine 120, via the correlation engine 130, can retrieve a set of sequences of events involving the Event of Interest and events similar to the Event of Interest, in addition to the events that occurred within a certain time period before and after the Event of Interest and the events similar to the Event of Interest.

Figure 3:
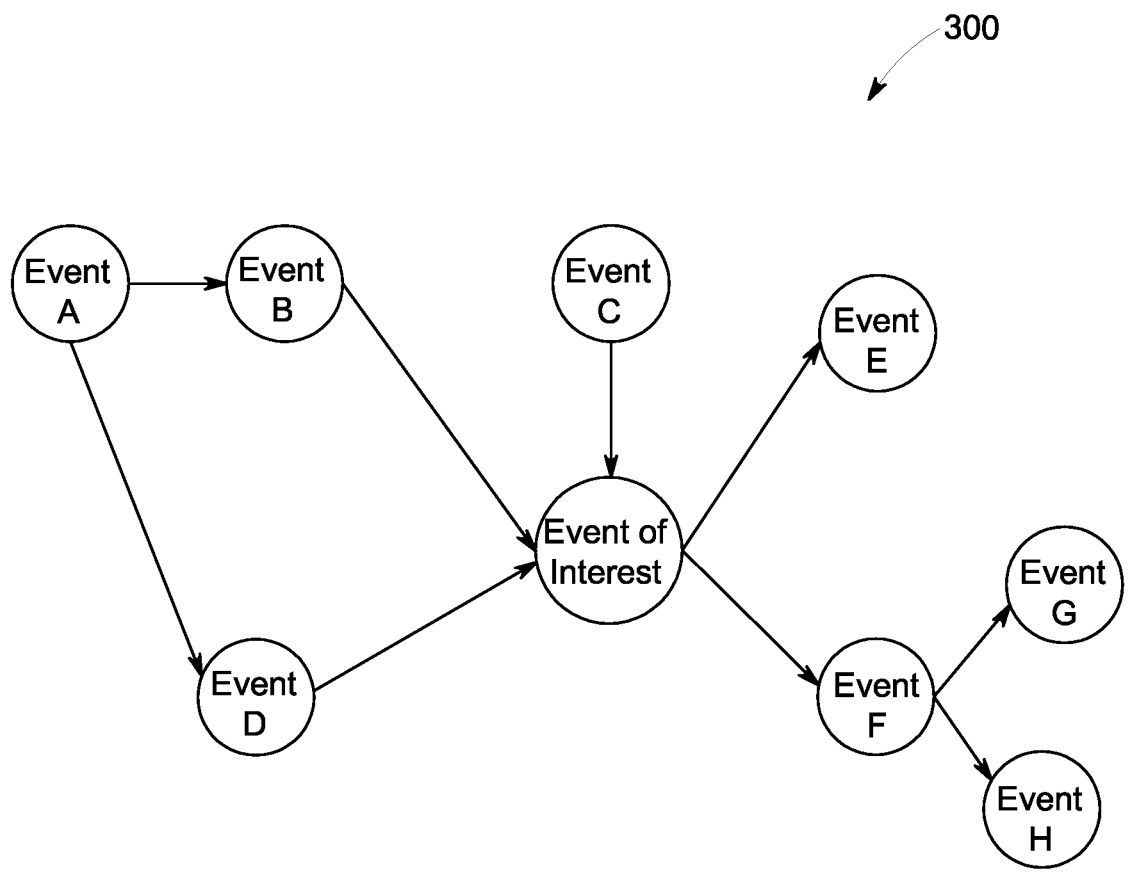
FIG. 3 diagrammatically illustrates a chart of an example of an inter-relation between correlated events.

In exemplary embodiments, the correlation engine 130 implements various algorithms such as but not limited to pattern matching algorithms or neural networks to discover patterns within the set of sequences of events, assigning a correlation value to each sequence. The correlation value may be a mathematically-significant correlation coefficient, or a discrete correlation estimate (high, medium, low). In exemplary embodiments, the output of the correlation engine 130 is a graph with nodes corresponding to events, and edges being a correlation value between events. The graph is used as the input for the root-cause analysis engine 145. The root-cause analysis engine 145 analyzes all events correlated to the Event of Interest in order to discover possible root causes of the Event of Interest. FIG. 3 diagrammatically illustrates a chart 300 of an example of an inter-relation between correlated events. The example illustrates an example of how the system 100 can diagrammatically illustrate a correlation of events. The example illustrates that the Event of Interest is directly affected by Event B and Event D, both of which are affected by Event A. The example further illustrates that that the Event of Interest affects Event E and Event F, which then affects Event G and Event H. Event C may be independent.

Figure 4:
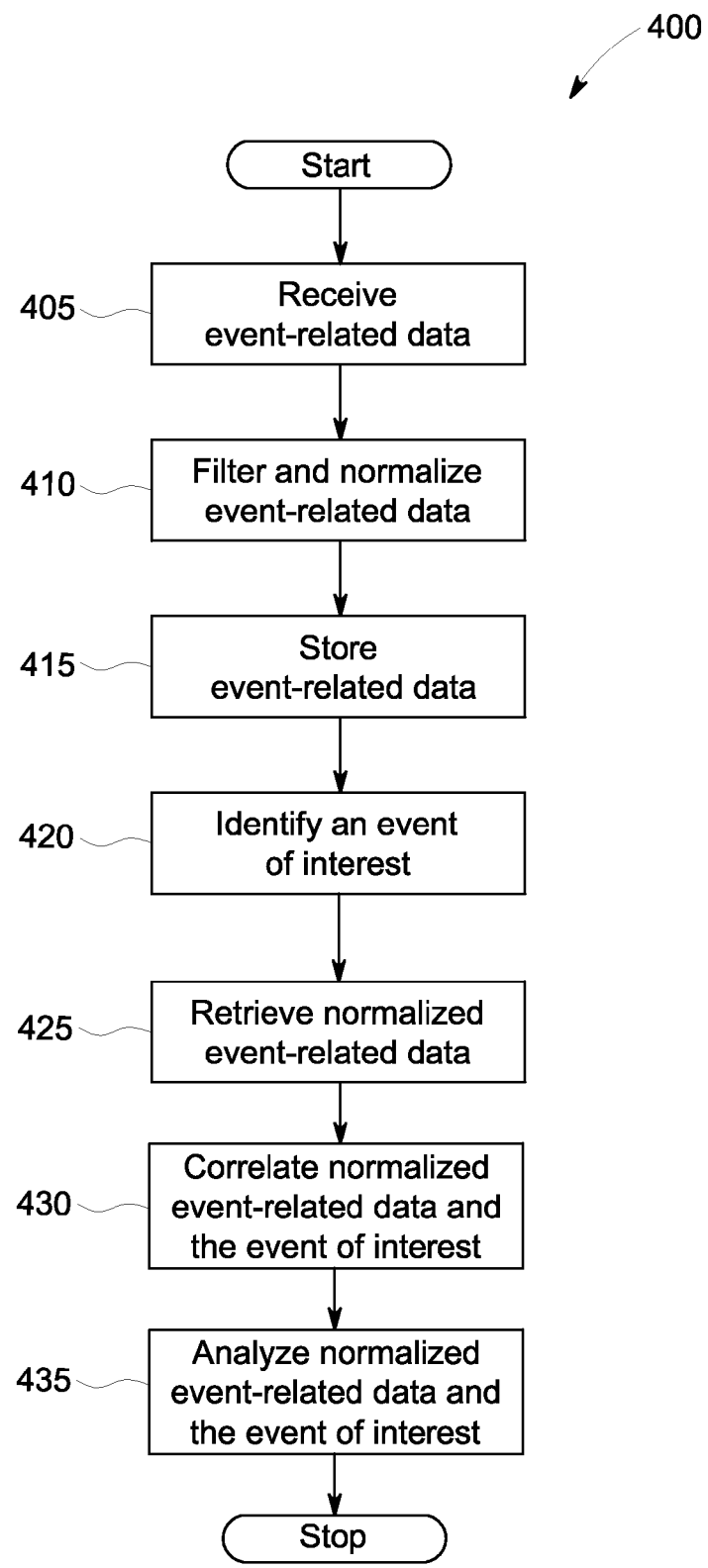
FIG. 4 illustrates a flow chart of a method for correlating power distribution network events and analyzing root causes of the power distribution network events in accordance with exemplary embodiments.

FIG. 4 illustrates a flow chart of a method 400 for correlating power distribution network events and analyzing root causes of the power distribution network events in accordance with exemplary embodiments. At block 405, the system receives data from a variety of data sources such as the power distribution network events 110 and the external events 115. At block 410, the data is filtered to retrieve the relevant data for potentially related events, and the relevant data is normalized. It will be appreciated that the gathering and normalizing of data is a continuous process. At block 415, the normalized relevant data is stored in the event database 105 as described herein. At block 420, the system 100 identifies an event of interest (e.g., the event of interest 125 from FIG. 1). At block 425, the data stored in the event database 105 is retrieved by the querying engine 120 to investigate and identify event correlations. At block 430, the events are correlated as described herein. At block 435, the events are analyzed to discover one or more root causes of the event of interest as described herein.

Figure 5:
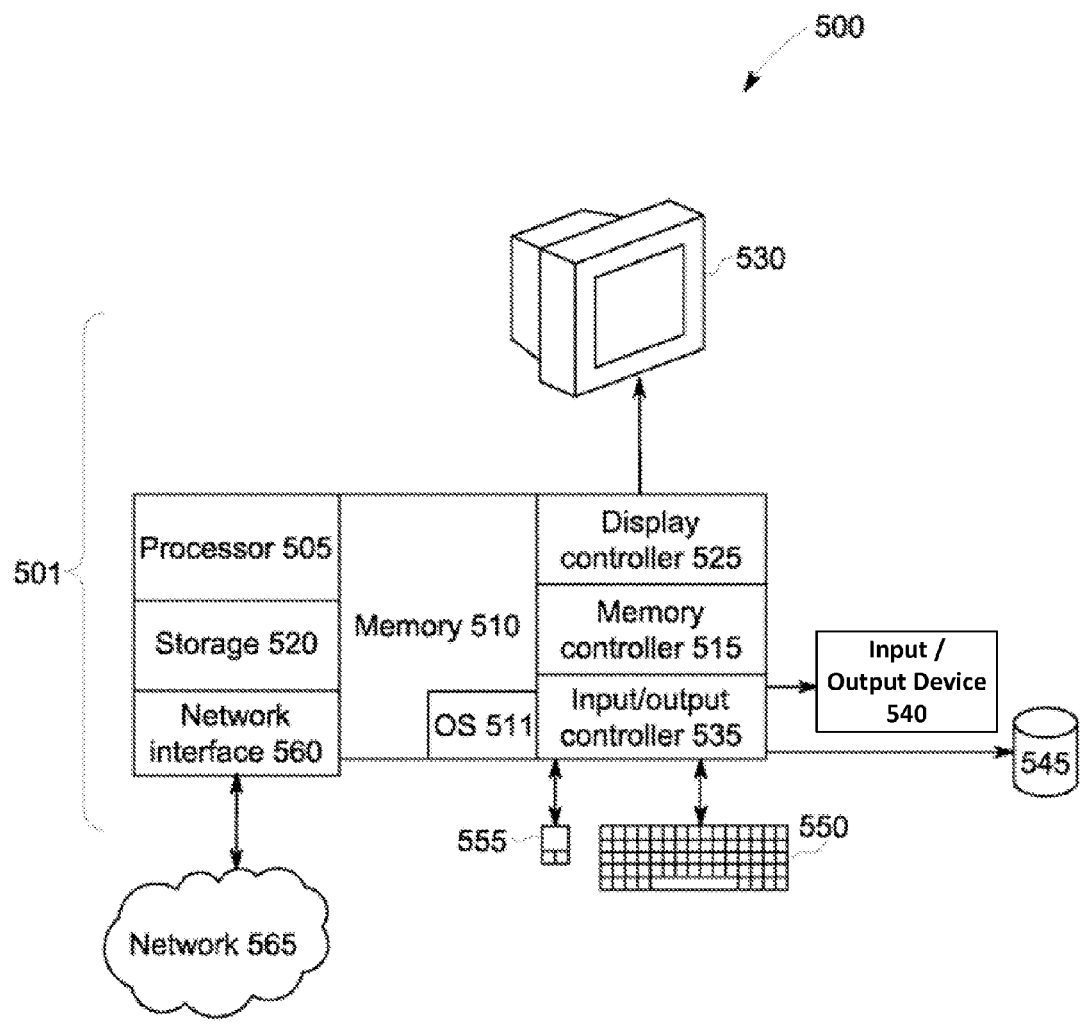
FIG. 5 illustrates an exemplary embodiment of a system that can be implemented for correlating power distribution network events and analyzing root causes of the power distribution network events.

The querying engine 120, the correlation engine 130, the root-cause analysis engine 145, and the various external systems described herein can implement any suitable computing device as now described. FIG. 5 illustrates an exemplary embodiment of a system 500 that can be implemented for correlating power distribution network events and analyzing root causes of the power distribution network events. The methods described herein can be implemented in software (e.g., firmware), hardware, or a combination thereof. In exemplary embodiments, the methods described herein are implemented in software, as an executable program, and are executed by a special or general-purpose digital computer, such as a personal computer, workstation, minicomputer, or mainframe computer. The system 500 therefore includes general-purpose computer 501.

In exemplary embodiments, in terms of hardware architecture, as shown in FIG. 5, the computer 501 includes a processor 505, memory 510 coupled to a memory controller 515, and one or more input and/or output (I/O) devices 540, 545 (or peripherals) that are communicatively coupled via a local input/output controller 535. The input/output controller 535 can be, but is not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 505 is a hardware device for executing software, particularly that stored in memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing software instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The software in memory 510 may include one or more separate programs, each of which comprises an ordered listing of executable instructions for implementing logical functions. In the example of FIG. 5, the software in the memory 510 includes the power distribution network event correlation and analysis methods described herein in accordance with exemplary embodiments and a suitable operating system (OS) 511. The OS 511 essentially controls the execution of other computer programs, such as the power distribution network event correlation and analysis systems and methods as described herein, and provides scheduling, input-output control, file and data management, memory management, and communication control and related services.

The power distribution network event correlation and analysis methods described herein may be in the form of a source program, executable program (object code), script, or any other entity comprising a set of instructions to be performed. When a source program, the program needs to be translated via a compiler, assembler, interpreter, or the like, which may or may not be included within the memory 510, so as to operate properly in connection with the OS 511. Furthermore, the power distribution network event correlation and analysis methods can be written as an object oriented programming language, which has classes of data and methods, or a procedure programming language, which has routines, subroutines, and/or functions.

In exemplary embodiments, a conventional keyboard 550 and mouse 555 can be coupled to the input/output controller 535. Other output devices such as the I/O devices 540, 545 may include input devices, for example but not limited to a printer, a scanner, a microphone, and the like. Finally, the I/O devices 540, 545 may further include devices that communicate both inputs and outputs, for instance but not limited to a network interface card (NIC) or a modulator/demodulator (for accessing other files, devices, systems, or a network), a radio frequency (RF) or other transceiver, a telephonic interface, a bridge, a router, and the like. The system 500 can further include a display controller 525 coupled to a display 530. In exemplary embodiments, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In exemplary embodiments, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), an intranet or other suitable network system and includes equipment for receiving and transmitting signals.

If the computer 501 is a PC, workstation, intelligent device or the like, the software in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute software stored within the memory 510, to communicate data to and from the memory 510, and to generally control operations of the computer 501 pursuant to the software. The power distribution network event correlation and analysis methods described herein and the OS 511, in whole or in part, but typically the latter, are read by the processor 505, perhaps buffered within the processor 505, and then executed.

When the systems and methods described herein are implemented in software, as is shown in FIG. 5, the methods can be stored on any computer readable medium, such as storage 520, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In exemplary embodiments, where the power distribution network event correlation and analysis methods are implemented in hardware, the power distribution network event correlation and analysis methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include the ability of utilities to make better informed decisions resulting in an assignment of resources and in the avoidance of potential failures, resulting in cost savings for the utilities and better service statistics. The systems and methods described herein identify the potential root causes of a particular event, even when such root cause may originate from a different distribution network than that of the event, or when the root cause may be an event outside of the distribution networks, such as weather conditions, catastrophes and the like. Discovery of the information allows utilities to better plan their network structures, to better estimate equipment and personnel requirements, to better position repair crews, and to estimate possible event probabilities given current circumstances (e.g., current weather patterns, tornado advisories and the like.)

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for power distribution network correlation and analysis, the method comprising:
    receiving event data of a plurality of events from a plurality of sources, wherein at least a portion of the event data is non-network data;
    identifying, based at least in part on an analysis of the event data of the plurality of events, an event of interest and at least one event determined to be potentially related to the event of interest, wherein the event of interest and the at least one event determined to be potentially related to the event of interest are selected from the plurality of events, and wherein the at least one event determined to be potentially related to the event of interest occurred within a predetermined time period proximate to an occurrence of the event of interest;
    retrieving, in a querying engine, event data of the event of interest and event data of the at least one event determined to be potentially related to the event of interest, wherein the event data of the event of interest and the event data of the at least one event determined to be potentially related to the event of interest are comprised in the received event data of the plurality of events;
    correlating the event data of the event of interest and the event data of the at least one event determined to be potentially relevant to the event of interest to thereby correlate the event of interest and the at least one event determined to be potentially related to the event of interest; and
    identifying one or more root causes of the event of interest based at least in part on analysis of the event data of the event of interest and the event data of the at least one event determined to be potentially relevant to the event of interest.

2. The method as claimed in claim 1 wherein the plurality of data sources includes at least one of power distribution network event data and related data.

3. The method as claimed in claim 1 wherein correlating the event data and the event of interest includes identifying event data that occurred during a time prior to and after the event of interest.

4. The method as claimed in claim 1 wherein the event data includes characteristics that match characteristics of the event of interest within predetermined thresholds.

5. The method as claimed in claim 1 further comprising assigning the event data a correlation value.

6. The method as claimed in claim 1 further comprising: filtering the event data; normalizing the event data; and storing the event data in an event database.

7. The method as claimed in claim 6 wherein the event data is filtered to retrieve relevant data.

8. The method as claimed in claim 6 wherein the power distribution network event data is normalized to transform a plurality of data structure types to a single data structure type for the plurality of data sources.

9. A computer program product including a non-transitory computer readable medium storing instructions for causing a computer to implement a method for power distribution network correlation and analysis, the method comprising:

receiving event data of a plurality of events from a plurality of sources, wherein at least a portion of the event data is non-network data;

identifying, based at least in part on an analysis of the event data of the plurality of events, an event of interest and at least one event determined to be potentially related to the event of interest, wherein the event of interest and the at least one event determined to be potentially related to the event of interest are selected from the plurality of events, and wherein the at least one event determined to be potentially related to the event of interest occurred within a predetermined time period proximate to an occurrence of the event of interest;

retrieving, in a querying engine, event data of the event of interest and event data of the at least one event determined to be potentially related to the event of interest, wherein the event data of the event of interest and the event data of the at least one event determined to be potentially related to the event of interest are comprised in the received event data of the plurality of events;

correlating the event data of the event of interest and the event data of the at least one event determined to be potentially relevant to the event of interest to thereby correlate the event of interest and the at least one event determined to be potentially related to the event of interest; and identifying one or more root causes of the event of interest based at least in part on analysis of the event data of the event of interest and the event data of the at least one event determined to be potentially relevant to the event of interest.

10. The computer program product as claimed in claim 9 wherein the plurality of data sources includes at least one of power distribution network event data and related data.

11. The computer program product as claimed in claim 9 wherein correlating the event data and the event of interest includes identifying event data that occurred during a time prior to and after the event of interest.

12. The computer program product as claimed in claim 9 wherein the event data includes characteristics that match characteristics of the event of interest within predetermined thresholds.

13. The computer program product as claimed in claim 9 wherein the method further comprises assigning the event data a correlation value.

14. The computer program product as claimed in claim 9 wherein the method further comprises: filtering the event data; normalizing the event data; and storing the event data in an event database.

15. The computer program product as claimed in claim 14 wherein the event data is filtered to retrieve relevant data.

16. The computer program product as claimed in claim 14 wherein the power distribution network event data is normalized to transform a plurality of data structure types to a single data structure type for the plurality of data sources.

17. A system for power distribution network analysis, the system comprising:

an event database storing event data of a plurality of events from a plurality of filtered and normalized data sources, wherein the event data is filtered and normalized, and wherein at least a portion of the event data is non-network data;

a querying engine coupled to the event database configured to:

identify, based at least in part on an analysis of the event data of the plurality of events, an event of interest and at least one event determined to be potentially related to the event of interest, wherein the event of interest and the at least one event determined to be potentially related to the event of interest are selected from the plurality of events, and wherein the at least one event determined to be potentially related to the event of interest occurred within a predetermined time period proximate to an occurrence of the event of interest; and retrieve event data of the event of interest and event data of the at least one event determined to be potentially related to the event of interest, wherein the event data of the event of interest and the event data of the at least one event determined to be potentially related to the event of interest are comprised in the received event data of the plurality of events;

a correlation engine coupled to the querying engine, and configured to correlate the event data of the event of interest and the event data of the at least one event determined to be potentially relevant to the event of interest to thereby correlate the event of interest and the at least one event determined to be potentially related to the event of interest;

and a root-cause analysis engine coupled to the correlation engine, and configured to discover patterns among the event of interest and the event data to identify one or more root-causes of the event of interest based at least in part on analysis of the event data of the event of interest and the event data of the at least one event determined to be potentially relevant to the event of interest.

18. The system as claimed in claim 17 wherein the plurality of data sources includes at least one of power distribution network event data and related data.

19. The system as claimed in claim 17 wherein the correlation engine is configured to identify event data that occurred during a time prior to and after the event of interest.

20. The system as claimed in claim 17 wherein the event data includes characteristics that match characteristics of the event of interest within predetermined thresholds.

* * * * *

UNITED STATES PATENT AND TRADEMARK OFFICE
CERTIFICATE OF CORRECTION

PATENT NO. : 9,093,841 B2  
APPLICATION NO. : 13/398196  
DATED : July 28, 2015  
INVENTOR(S) : San Andres et al.

Page 1 of 1

It is certified that error appears in the above-identified patent and that said Letters Patent is hereby corrected as shown below:

In the specification

Column 2, Line 65, delete "analysis" and insert -- analysis, --, therefor.

Column 5, Line 36, delete "that that" and insert -- that --, therefor.

Column 7, Line 28, delete "(WAN)" and insert -- (WAN), --, therefor.

Signed and Sealed this
Second Day of February, 2016

Michelle K. Lee
*Director of the United States Patent and Trademark Office*